Patented Mar. 28, 1950

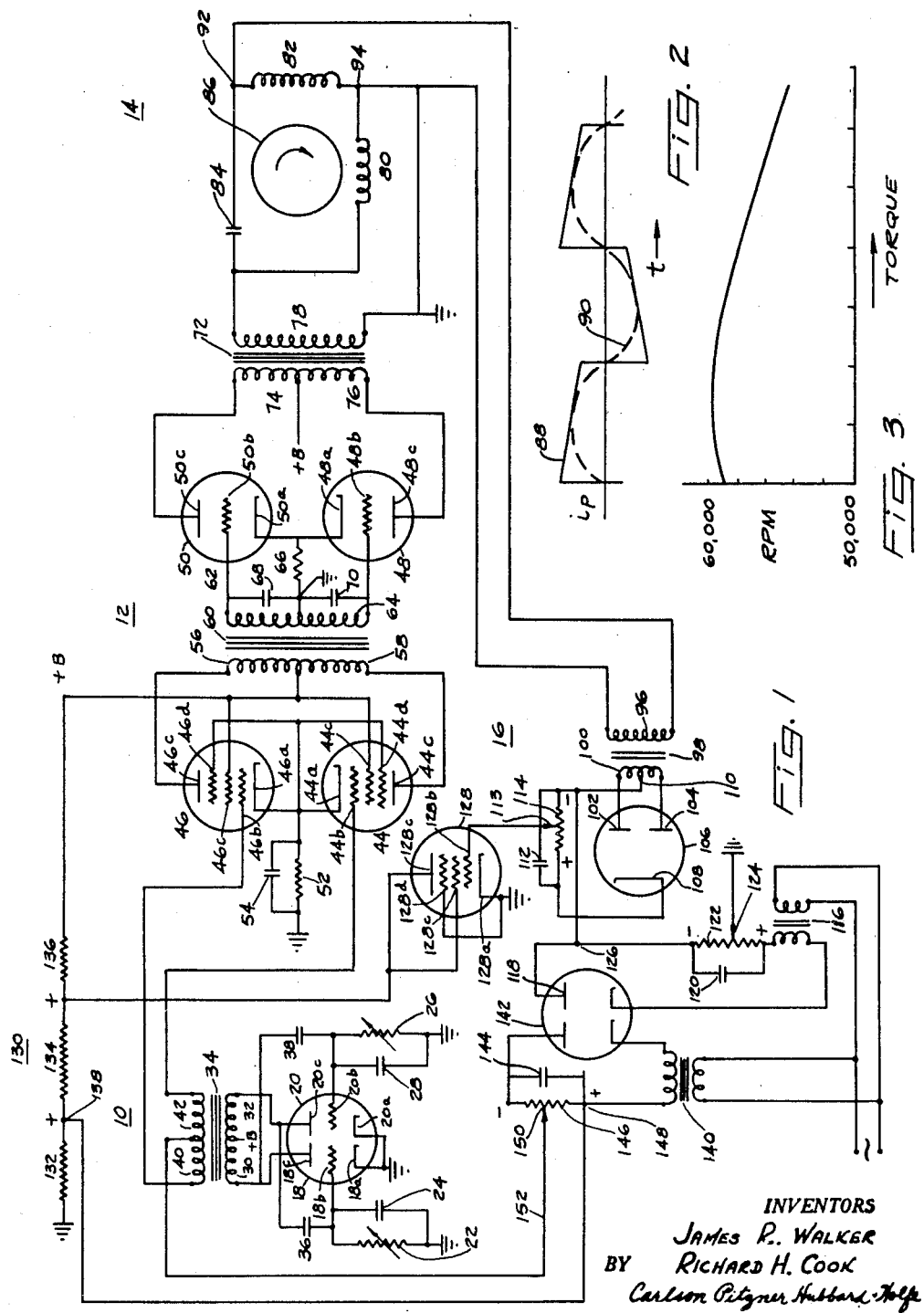

2,502,189

UNITED STATES PATENT OFFICE 2,502,189

HIGH-FREQUENCY GENERATOR FOR INDUCTION MOTORS

James R. Walker and Richard H. Cook, Detroit, Mich., assignors to Ex-Cell-O Corporation, Detroit, Mich., a corporation of Michigan Application March 29, 1946, Serial No. 657,988

8 Claims. (Cl. 318—310)

The present invention relates to a high frequency generator circuit for a high speed induction motor. More particularly, the invention relates to a multivibrator-excited impulse generator having load sensitive means for automatically controlling the power supplied to the motor.

The use of motors operating at speeds in the range of 50,000 to 80,000 R. P. M. in industrial applications such as grinding, centrifuging and the like has been retarded in general by electrical and mechanical problems not normally encountered in the operation of motors at more conventional speeds. Such problems include lack of efficiency, overheating, unsatisfactory torque characteristics and poor speed regulation. A contributing factor in the generally unsatisfactory operation of alternating current motors at high speed is believed to be the hysteresis and eddy current losses which are pronounced at high exciting frequencies, especially when the exciting signal contains appreciable harmonic content. An additional problem encountered in an attempt to improve the speed regulation of high speed induction motors resides in the fact that the necessarily small diameter and hence exceedingly low inertia makes such a motor more subject to transient changes in the loading.

It is the primary object of the invention to provide a generator for supplying current to a high speed induction motor which enables operation of the motor at maximum efficiency with a minimum of losses to be dissipated within the motor in the form of heat.

It is another object of the invention to produce a high speed drive having predetermined speed regulation characteristics and having a controllable amount of speed droop with increased loading.

It is still another object of the invention to produce means for speed regulation which is sensitive to load changes but which requires no regulator control signal in addition to that obtainable at the terminals of the driven machine.

It is a further object of the invention to provide a high frequency generator producing an output wave which is substantially sinusoidal.

It is a still further object of the invention to provide an exciting generator for a high speed induction motor which enables the motor to attain full operating speed under load in a minimum of time, even when the power capabilities of the generator are relatively low.

It is an object of the invention to provide a high speed induction motor drive which corrects rapidly for changes in applied load, It is another object of the invention to effect regulation by means which is responsive to the magnitude of the signal exciting the regulator but which is completely independent of the phasing of such signal.

Further objects and advantages of the invention will become apparent as the following description proceeds, taken in connection with the accompanying drawings in which:

Figure 1 is a schematic representation of a circuit illustrating one embodiment of our invention.

Fig. 2 shows the output wave of the multivibrator portion of the circuit shown in Fig. 1.

Fig. 3 is a speed torque characteristic typical of the type readily obtainable with the circuit shown in Fig. 1.

While the invention is susceptible of various modifications and alternate constructions and uses, we have shown in the drawings and will herein describe in detail one embodiment of the invention. It is to be understood that we do not intend to limit the invention by such disclosure, but aim to cover all modifications and alternative constructions and uses falling within the spirit and scope of the invention as expressed in the appended claims.

Examples of applications requiring driving speeds of upwards of 50,000 R. P. M. include high speed grinding with grinding wheels of small diameter, the driving of centrifuges and numerous types of test equipment. The induction motor used is preferably of the two-pole type having a rotor of small diameter in order to keep the centrifugal forces within limits of safety. The motor is preferably provided with at least two windings, one of which includes a phase displacing impedance to insure that the magnetic field acting upon the rotor has a strong rotating component. Because of the increased losses inherent in motors having high rotative speeds it may be found necessary to provide artificial cooling in the form of a water jacket, air blast, or the like, although such provision in itself forms no part of the present invention.

Referring now to Figure 1, it will be seen that the circuit embodying the invention performs three primary functions. The first of such functions is the generation of impulses at high frequency which is accomplished by the multivibrator indicated generally by the numeral 10. The second function, namely that of producing appreciable power output at the frequency of the multivibrator is accomplished by the amplifier indicated by the numeral 12 which feeds into an alternating current motor 14. The third function, that of speed regulation and control, is performed by the regulating portion 16 of the circuit. Each of the above named portions of the circuit, as will be seen as the discussion proceeds, cooperates effectively and in a novel manner with the remaining portions of the circuit to produce the improved electric drive which is the subject of our invention.

The multivibrator portion 10 of our device includes a pair of discharge devices or tubes 18 and 20 which may, if desired, be mounted in a single envelope as shown. The discharge device 18 has a cathode 18a, a grid 18b and a plate 18c, while the discharge device 20 includes a cathode 20a, a grid 20b and a plate 20c. The grid 18b is grounded through a variable resistor 22 which is shunted by means of a capacitor 24 to form an input circuit, while in the case of the discharge device 20 the same function is performed by the variable resistor 26 and the shunting capacitor 28. The output circuits of the tubes 18, 20 include the plates 18c and 20c, sections 30 and 32 respectively of the primary winding of a transformer 34, and a source of direct voltage. A coupling capacitor 36 serves to connect the grid 18b with the plate 20c of the opposed discharge device, while a similar capacitor 38 couples the grid 20b with the plate 18c to form a symmetrical circuit. Windings 40 and 42 on the transformer 34 serve as secondary or output windings feeding into the amplifier 12.

The amplifier 12 may have as many stages as desired and may have a power output, depending upon the power requirements of the motor which it is desired to drive. In the embodiment shown in Fig. 1 we have included a voltage amplifying stage having pentode tubes 44 and 46 in a push-pull relation and a transformer-coupled output stage having power tubes 48 and 50. The tube 46 includes a cathode 46a, a control grid 46b, a screen grid 46c, a suppressor grid 46d and a plate 46e, equivalent elements in the tube 44 being indicated by like subscripts. The cathodes 46a and 44a are preferably grounded through a source of self-bias consisting of a bias resistor 52 and a bypass capacitor 54. The plates 46e and 44e are respectively connected to sections 56 and 58 which form the primary of a coupling transformer 60. The signal for exciting the grid of the power tubes is produced across the secondary sections 62 and 64 of the coupling transformer 60. The power tube 50 has a cathode 50a, a grid 50b, and a plate 50c, and the cathode grid and plate of tube 48 are designated respectively 48a, 48b and 48c. The cathodes 48a and 50a of the power tubes may be biased by a cathode resistor 66 or by a source of fixed grid bias potential of any conventional type which need not be further described. Shunting the secondary sections 62 and 64 we have found it advisable to include capacitors 68 and 70, respectively. The latter are used for shunting to ground high order harmonic voltages and further serve partially to tune the transformer secondary thereby improving the form of the sinusoidal voltage wave appearing on the grids 48b and 50b.

The coupling of the motor 14 is effected by means of the coupling transformer 72 having primary windings 74 and 76, respectively, and a secondary winding 78. The voltage appearing across the secondary winding 78 is applied directly to one of the windings 80 of the motor 14. A remaining winding 82 is excited serially through an impedance, which in the present embodiment is a capacitor 84. Such capacitor serves to displace the phase of the current through the winding 82 with respect to that flowing through the winding 80 causing a revolving field and a resultant rotation of a rotor 86 which drives the load.

In the present embodiment the multivibrator or relaxation oscillator 10 is free running, that is, the rate of oscillation is determined solely by the circuit constants, particularly the constants of the R.-C. circuit associated with the grids of the tubes 18 and 20. It will appear to one skilled in the art, however, that the rate of oscillation may be controlled, if desired, by applying a synchronizing voltage to the grid or cathode circuit by any desired means. The frequency of the oscillator portion of the circuit is high and may be of the order of 15 to 20 times that of the normal commercially available sixty cycle supply.

The portions of the circuit thus far detailed, while not sufficient to produce a regulated output signal in accordance with our invention, are nevertheless subject to definite laws of operation and may conveniently be described at this point.

Assuming that a positive direct voltage is applied at the juncture of the windings 30—32 current will immediately begin to flow in one or the other of the plate circuits 18a—18c or 20a—20c. Because of inevitable non-symmetry of the circuits current will flow sooner and to a slightly greater extent in one of the tubes 18—20 than in the other. Let it be assumed, for example, that the tube 20 begins to conduct to a greater extent than the tube 18. Because of the greater voltage drop across winding 32 as compared to that across winding 30, the potential of the plate 20c of the tube 20 will begin to swing negatively. The voltage existing across capacitor 36 cannot change instantaneously, thus grid 18b of the tube 18 will also swing negatively causing decreased current to be conducted in tube 18. Decreased conduction in the latter tube, tending to reduce the voltage drop through winding 30 of the transformer 34, increases the positive voltage appearing on the plate 18c. Since the voltage across the capacitor 38 cannot change instantaneously, and because of the positive-going nature of the voltage on the plate 18c, the grid 20b will also start to swing in a positive direction. This has the effect of further increasing conduction in the tube 20 and the above process is repeated until the tube 20 is strongly conducting and the tube 18 is in a non-conducting state. Such condition will exist until the negative charge which is stored on the grid side of the capacitor 24 begins to leak off through the resistor 22. After sufficient leakage has taken place the grid 18b will become less negative with the result that conduction is initiated in tube 18. An increase in conduction in tube 18, because of the voltage drop in the winding 30, will cause the voltage appearing on the plate 18c of the tube 18 to swing negatively. Because of the capacitor 38 the negative swing of the plate 18c causes a simultaneous reduction in positive potential on the grid 20b, thereby causing tube 20 to become slightly less conducting. Reduced conduction in tube 20 is immediately reflected in a higher voltage existing on plate 20c and an increased positive voltage on the grid 18b. Thus, a point is reached at which tube 18 is heavily conducting and tube 20 is not conducting at all, which is just reverse of the condition which originally existed. Subsequent leakage of negative charge from the capacitor 28 through the resistor 26 causes tube 20 again to become heavily conducting and the cycle is repeated. Although the above description has considered the transfer of conduction from one tube to the other to take place in steps, as a matter of fact such transfer is extremely rapid, taking place practically instantaneously after sufficient leakage of charge has occurred from the grid of the non-conducting tube.

The operation of the circuit as thus far described would normally be expected to produce a rectangular wave of a cyclic period depending upon the time constant of the R.-C. circuits 22—24 and 26—28, respectively. It will be noted, however, that a capacitive path exists across the outer terminal of the primary of the transformer 34. Such capacitive path is formed by the following capacitors in series: 38—28—24—36. If desired additional capacitance may be placed in parallel with the foregoing capacitors across the outer terminals of the transformer primary. Such capacitance cooperates with the inductance of the primary winding to produce a tuned L.-C. circuit. The effect of such capacitance and inductance is illustrated by reference to Fig. 2.

In Fig. 2 the numeral 88 represents the combined plate current of the tubes 18 and 20, assuming that no inductive-capacitive circuit is associated with the plate of the tubes. The portion of the rectangular wave 88 lying above the axis indicates the current drawn by one of the tubes while the portion of the curve lying below the axis indicates the current drawn by the remaining tube. Because of the flywheel-like action of the plate circuit as illustrated, it is not possible for full conduction to transfer immediately from one of the tubes to the remaining tube, hence the actual current curve more closely resembles the smooth curve 90 which approaches a sinusoidal wave. Such a wave has an obviously reduced harmonic content as compared to the rectangular wave 88 normally associated with multivibrator circuits.

The voltage appearing across the primary winding 30—32 is reflected into the secondary winding 40—42 and applied to the control grids 44b and 46b of the voltage amplifier tubes 44 and 46. Amplification takes place in this stage in the conventional manner and it will suffice to say that a greatly amplified voltage appears across the secondary windings 62—64 associated with the control grids 48b and 50b of the power amplifier tubes. Since the latter tubes are preferably of a high voltage type admitting of considerable power dissipation, a high voltage signal sufficient to produce a large flow of current appears across the secondary 78 of the output transformer 72. The latter exciting signal produces a flow of alternating current in the winding 80 of the motor 14 and a current displaced in phase in the winding 82 of the motor. Since the frequency of the exciting signal is the same as that generated by the multivibrator, the speed of the rotor 86 of the induction motor will increase until a speed is attained which is substantially synchronous with respect to the frequency of the exciting voltage. The speed of the rotor 86 will remain at a substantially synchronous speed until a mechanical load is applied to the rotor causing the rotor to suffer a reduction in speed. The following section is directed to means for preventing a reduction in speed below a predetermined desired value.

*Speed regulation*

As stated above, the synchronous speed of the induction motor is determined by adjustment of the electrical constants, particularly resistors 22 and 26, in the grid circuit of the multivibrator 10. In order to maintain the speed near its synchronous value under varying degrees of load and to prevent excessive droop of the speed torque curve it is necessary to provide an automatic regulating device, the present embodiment of which is indicated generally by the numeral 16 in Fig. 1. The regulator is excited by a voltage appearing across one of the windings 80 or 82 of the motor 14 and reflecting any changes in the exciting voltage as corrective changes in the gain of the amplifier 12. Such regulation is accomplished in two primary steps. The first step consists of rectifying the voltage obtained from one of the motor windings, and the second step includes amplifying the direct voltage signal by a direct coupled amplifier and applying such amplified signal to the control grids of the voltage amplifier stage in the form of additional grid bias. In addition to the above mentioned primary steps we include a number of operations of a supplementary nature which assist markedly in producing the novel and effective scheme of motor control which we disclose.

The signal utilized for speed regulation in the present instance is obtained from terminals 92 and 94 of motor winding 82 and is applied to the primary winding 96 of a regulator input transformer 98. After transformation the exciting voltage appears across the secondary 100 of the transformer 98 the outer terminals of which are connected to plates 102 and 104 of a full wave rectifier 106 which has in addition a cathode 108. Connected between the center tap 110 of the winding 100 and the cathode 108 is a storage capacitor 112 which is shunted by an adjustable voltage dividing potentiometer 114 having a slider 113.

The direct voltage existing across capacitor 112 is obviously a function of the alternating exciting voltage obtained from the motor winding. To increase sensitivity of the circuit to voltage changes, we prefer to provide a local source of direct voltage which is bucked against the direct voltage obtained from the potentiometer 114 to produce a differential voltage used to excite the direct coupled amplifier portion of the regulator. In the present embodiment the local source of fixed direct voltage is obtained from a power supply including a transformer 116, a rectifier 118, a capacitor 120, and a shunting potentiometer 122. The transformer may obtain its power from any desired alternating source and the direct voltage appearing across the capacitor 120 is a function of the voltage appearing across the transformer secondary. The slider 124 of the potentiometer 122 is grounded thereby producing a negative voltage with respect to ground on the plate of the rectifier 118. Terminal 126 which is connected to the plate of the rectifier tube serves to connect the source of fixed direct voltage to the source of variable direct voltage. It will be noted that the two sources of direct voltage are connected in opposition through the following circuit: ground—124—126—113. By a readily effected adjustment of the sliders 113 and 124 of the potentiometers the output voltage appearing on the slider 113 may be caused to be zero (or any other predetermined equilibrium value) for any desired speed-torque condition.

Turning now to the direct coupled amplifier which is excited by the differential direct voltage obtained from the circuits discussed immediately above, we find that such amplifier consists of two main components. The first of these is an amplifier tube 128 which has a cathode 128a, a control grid 128b, a screen grid 128c, a suppressor grid 128d, and a plate 128e. The second component is a voltage divider 130 having sections 132, 134 and 136. The control grid 128b obtains its direct voltage input signal from the slider 113 of the potentiometer 114 as stated above. The plate of the tube 128 obtains positive voltage from the voltage divider 130, such voltage being somewhat less than the full voltage existing across the voltage divider by reason of the voltage drop through the portion 136. The amount of such voltage drop varies in accordance with the amount of current being drawn by the plate 128e of the amplifier tube. As the plate current varies there will be a corresponding voltage variation at terminal 138 of the voltage divider 130 and it is the voltage at terminal 138 which is utilized in controlling the bias on the main voltage amplifier tubes 45 and 46.

The voltage of terminal 138 is not utilized directly, however, but it is bucked against a local fixed source of direct voltage obtained from a power supply including transformer 140, rectifier 142, capacitor 144 and shunting potentiometer 146. The operation of the power supply including the latter components is substantially identical to that discussed in connection with rectifier 118 which may occupy the other half of the envelope. With the rectifier circuit connected as shown in Fig. 1, an adjustable negative voltage (with respect to terminal 148) will exist on slider 150 of the potentiometer 146. The local fixed voltage source is connected in bucking relation to the direct voltage existing between terminal 138 of the voltage divider and ground through the following circuit: ground—138—148—150. The negative voltage exising at the slider 150 is applied to the control grids 44b and 46b of the voltage amplifier through line 152 and the midpoint of the windings 40 and 42 of the multivibrator output transformer 34. By adjustment of the potentiometer slider 150 it is possible to produce the required biasing effect on the voltage amplifier tubes 44 and 46 to keep the induction motor operating stably at a predetermined condition of speed and torque.

The operation of the direct coupled amplifier portion of the regulator may be summarized as follows: Assuming that the grid 128b of the direct coupled amplifier tube 128 swings positively because of a positive-going potential on slider 113, an increased current will be conducted by the cathode-plate circuit of the tube. The resulting voltage drop through section 136 of the resistor 130 will cause the voltage on the plate 128e of the direct coupled amplifier tube to drop and there will be a corresponding drop in the positive potential of terminal 138 of the voltage divider. This causes slider 150 to become more negative with respect to ground increasing the negative bias on the control grids 44b and 46b reducing the gain of the amplifier.

Considering now the operation of the regulator as a whole, it is seen that any drop in the voltage across terminals 92 and 94 of the motor winding 82 caused by an increase in the mechanical load on the motor is reflected by a drop in the alternating voltage applied to the rectifier tube 106 and a corresponding drop in the direct potential existing across the right-hand leg of the potentiometer 114. Since the direct voltage produced across potentiometer 124 by the rectifier 118 remains constant, the change in voltage across potentiometer 114 will cause the grid 128b of the direct coupled amplifier tube 128 to be biased more negatively. As the result, the current drawn by plate 128e decreases causing a decreased voltage drop through section 136 of the voltage divider 130. This causes an increased positive voltage to appear at terminal 138 of the voltage divider causing the bias of the amplifier tubes 44 and 46 to swing in a positive direction increasing the gain of the amplifier. Such increased gain is reflected in an increased input signal on the grids 48b and 50b of the power amplifier tubes and consequently an increased voltage is applied to the motor windings. This increased voltage increases the motor torque tending to restore the speed of the motor to its initial value. It may be shown in like manner that the sudden decrease of mechanical load on the motor which is accompanied by an increase of voltage between terminals 92 and 94 of the motor winding 82 has the opposite effect. Such voltage increase produces a more negative voltage on the grids 44b and 46b of the voltage amplifier tubes reducing the gain of the amplifier and consequently reducing the voltage applied to the motor windings 80 and 82. The latter reduction in applied voltage reduces the torque generated within the motor thereby tending to reduce the speed to the value which existed before the mechanical load was removed.

It is well known in induction motor practice that the voltage change across the terminals of an induction motor under conditions of changing load is very slight. In order to produce a sensitive regulator, therefore, it is necessary that the means for detecting such voltage change be extremely sensitive. It will be apparent that the circuit which we disclose enables extremely sensitive detection of voltage changes upon changes in load due primarily to utilizing a differential circuit in which only the voltage changes are applied to the direct coupled amplifier tube. It is further to be noted that no self bias is used in the direct coupled amplifier. Accordingly, such amplifier is free from degenerative effects and produces an output signal which is the amplified reflection of the input signal. The sensitivity of the regulator is further increased by utilizing only the changes in the output signal of the direct coupled amplifier (as distinguished from absolutism of values of the same) to control the bias of the main amplifier. The latter is made possible by bucking the output of the direct coupled amplifier against a fixed voltage source as described above.

Because of the possibility of relative adjustment of potentiometers 114 and 122 it is possible to operate the direct coupled amplifier tube over any desired portion of its dynamic characteristic. By relative adjustment of the position of terminal 138 on the voltage divider 130 and the position of slider 150 on the potentiometer 146 it is possible to operate the amplifier tubes 44 and 46 over any desired portion of their dynamic characteristics. It is evident, therefore, that the circuit which we have disclosed is extremely flexible, allowing a wide range of speed torque characteristics to be obtained at the will of the operator. By proper adjustment of the potentiometers 114, 122, it is possible, for example, to produce a regulated motor control in which a constant speed is maintained over a wide range of load torque producing a "stiff" control. It has been found, however, that a slightly drooping characteristic, as shown for example in Fig. 3, is more desirable in practice, particularly since it enables a generator of lesser power capability to be successfully used with a given size of motor and in addition reduces tendency toward hunting. No numerical values of torque are given in Fig. 3 since the torque obviously depends upon the size and power rating of the motor. It will be noted, however, that as the torque applied to the motor increases from zero to the maximum rated value, there may be a drop of approximately 5 to 10% in the motor speed. It is to be noted that this amount of "droop" is under the control of the operator and may be varied to suit the requirements of the function to be performed.

It has been found in practice that a regulated high frequency generator constructed in accordance with the teachings disclosed herein produces an electric drive which is rapid in response and has extreme stability in spite of the application of severe transient loading. Because of the substantially sinusoidal nature of the exciting wave derived from the multivibrator, it has been found that efficiency of power conversion is high while the heating normally produced by the presence of undesired harmonics is kept to a minimum. It has further been found that a motor drive constructed in accordance with our teachings because of the regulating effect provided is enabled to accelerate from standstill to normal running speed in a minimum of time.

We claim as our invention:

1. A high frequency generator for driving a high speed induction motor, the combination comprising: multivibrator means including inductive output circuit; a capacitor in parallel with said output circuit; an amplifier excited by said output circuit, said amplifier being coupled to said motor and supplying power thereto; means including a rectifier excited by a voltage derived from the winding of the induction motor for producing a rectified voltage varying in accordance with the load on said motor; a direct voltage source, and means responsive to the difference between the rectified voltage and the voltage of said direct voltage source for controlling the bias of said amplifier, the polarity of said differential voltage being such that an increase of load on said induction motor increases the gain of said amplifier.

2. In a high frequency generator for exciting a high speed induction motor having a main winding and displaced phase winding, the combination comprising: multivibrator means for generating an output voltage at said high frequency, an amplifier excited by said multivibrator, said windings being excited by the output of said amplifier, means for deriving a voltage from at least one of said motor windings, a rectifier for producing a direct load-sensitive voltage from said derived voltage, a first fixed voltage source, a direct coupled amplifier excited by the voltage difference between said fixed voltage and said load-sensitive voltage, a second source of fixed voltage, means responsive to the voltage difference between the output voltage of said direct coupled amplifier and the voltage of said second fixed source for modifying the bias of said amplifier, the polarities of the circuit being so arranged that a decrease in the speed of said motor increases the gain of said amplifier.

3. In a high frequency generator for driving a high speed induction motor, a multivibrator operating at a correspondingly high frequency, an amplifier excited by said multivibrator for driving said induction motor, and load sensitive means for controlling the bias voltage applied to said amplifier to vary the electrical power supplied to said motor.

4. In a high frequency generator for driving a high speed induction motor having an exciting winding, the combination comprising: a multivibrator for generating an alternating voltage at a corresponding high frequency, am amplifier excited by the output of said multivibrator, the exciting winding of said high frequency motor being coupled to the output of said amplifier, means including a rectifier excited by a voltage derived from the exciting winding of said motor for producing a load-sensitive direct voltage, means for producing a fixed direct voltage, a direct coupled amplifier excited by the difference in voltage between said load-sensitive voltage and said fixed voltage, means excited by the output of said direct coupled amplifier for controlling the bias of said amplifier.

5. In a high frequency generator for driving a high speed induction motor, the combination comprising: a source of high frequency alternating voltage, an amplifier excited by said alternating voltage, said amplifier being coupled to said motor and supplying power thereto, means including a rectifier excited by a voltage derived from the winding of the induction motor for producing a rectified voltage varying in accordance with the load on said motor, a direct voltage source, and means responsive to the difference between the rectified voltage and the voltage of said direct voltage source for controlling the bias of said amplifier, the polarity of said differential voltage being such that an increase of load on said induction motor increases the gain of said amplifier.

6. In a high frequency generator for exciting a high-speed induction motor having a main winding and displaced phase winding, the combination comprising: a source of high frequency alternating voltage, an amplifier excited by said voltage, said windings being excited by the output of said amplifier, means for deriving a voltage from at least one of said motor windings, a rectifier for producing a direct load-sensitive voltage from said derived voltage, a first fixed voltage source, a direct coupled amplifier excited by the voltage difference between said fixed voltage and said load-sensitive voltage, a second source of fixed voltage, means responsive to the voltage difference between the output voltage of said direct coupled amplifier and the voltage of said second fixed source for modifying the bias of said amplifier, the polarities of the circuit being so arranged that a decrease in the speed of said motor increases the gain of said amplifier.

7. The method of producing a regulated alternating voltage for exciting the winding of an alternating current motor comprising: generating an alternating voltage at high frequency, amplifying said alternating voltage, applying said amplified voltage to said motor winding, deriving a voltage from said motor winding, rectifying said derived voltage, bucking the direct voltage produced by said rectifier against a source of fixed voltage to produce a differential voltage, amplifying said differential voltage, and utilizing the amplified differential voltage to vary the amplification of said alternating voltage thereby to regulate the speed of said motor.

8. The combination with a high-speed induction motor of the type in which an increase in voltage produces an appreciable increase in available torque, of a source of high frequency alternating voltage, means including a voltage amplifier for feeding the amplified output of said source of said motor, and regulating means operable in response to changes in the voltage across the terminals of said motor caused by speed changes therein for varying the gain of said amplifier to compensate for changes in motor speed.

JAMES R. WALKER.
RICHARD H. COOK.

REFERENCES CITED

The following references are of record in the file of this patent:

UNITED STATES PATENTS

| Number | Name | Date |
| --- | --- | --- |
| 2,254,852 | Miller | Sept. 2, 1941 |
| 2,297,926 | Usselman | Oct. 6, 1942 |
| 2,303,654 | Newton | Dec. 1, 1942 |
| 2,305,581 | Homrighous | Dec. 15, 1942 |
| 2,340,875 | Gibbs | Feb. 8, 1944 |
| 2,381,496 | Hansell | Aug. 6, 1945 |